Figure 1:
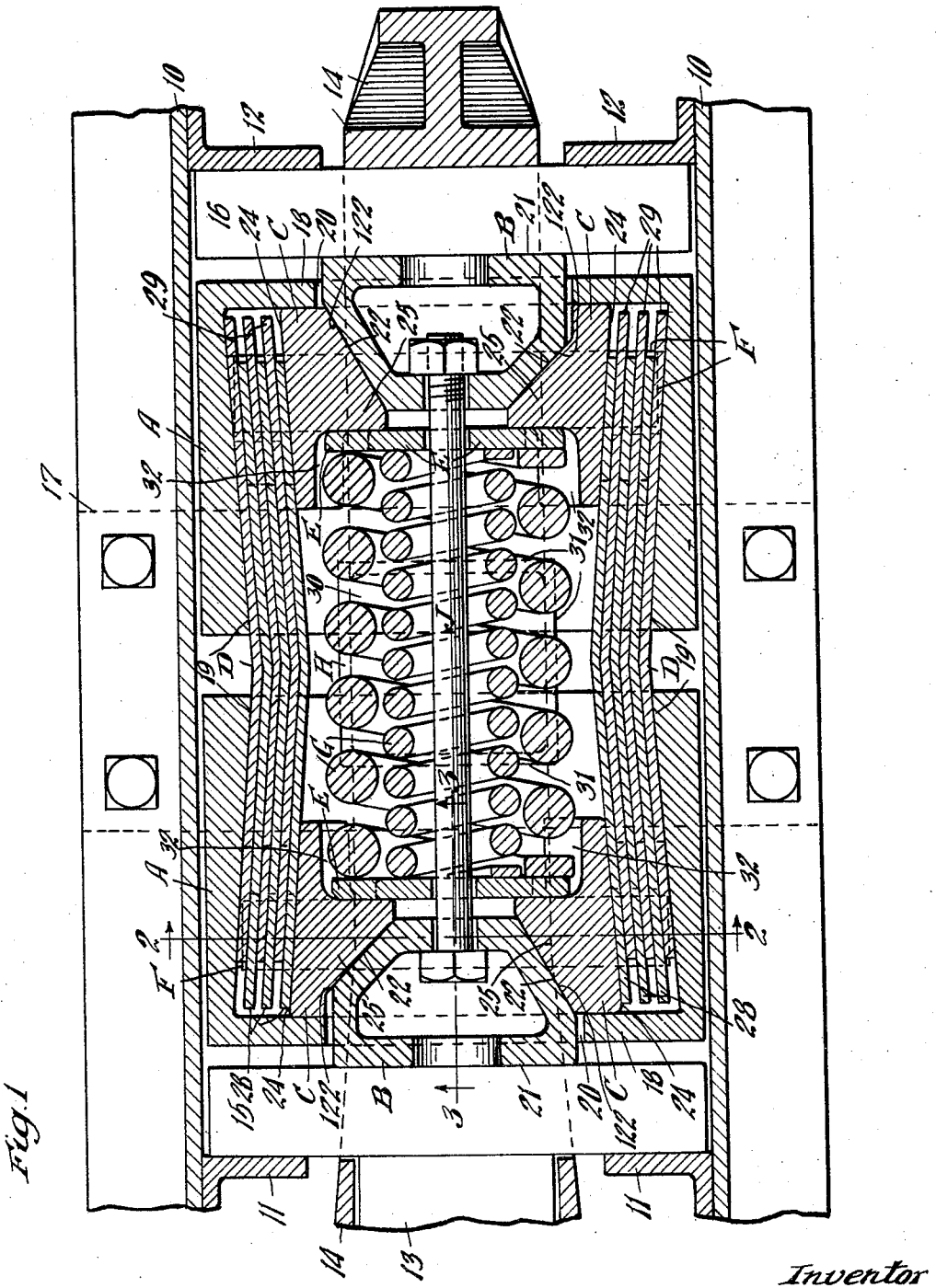

Feb. 21, 1933.　　　J. F. O'CONNOR　　　1,898,594

FRICTION SHOCK ABSORBING MECHANISM

Filed July 12, 1928　　　2 Sheets-Sheet 1

Witness
Wm Geiger

Inventor
John F. O'Connor
By Joseph Harris
His Atty.

Feb. 21, 1933.  J. F. O'CONNOR  1,898,594
FRICTION SHOCK ABSORBING MECHANISM
Filed July 12, 1928  2 Sheets-Sheet 2
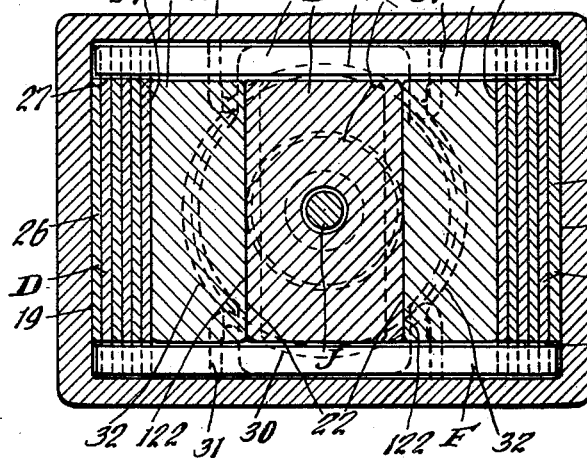
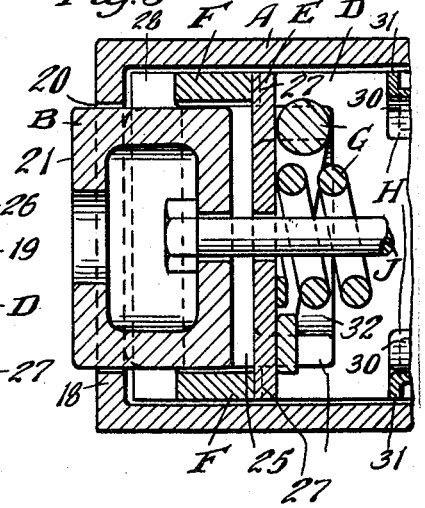
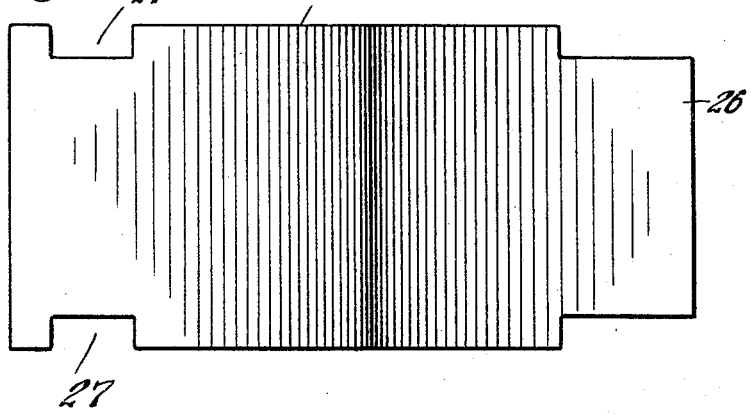
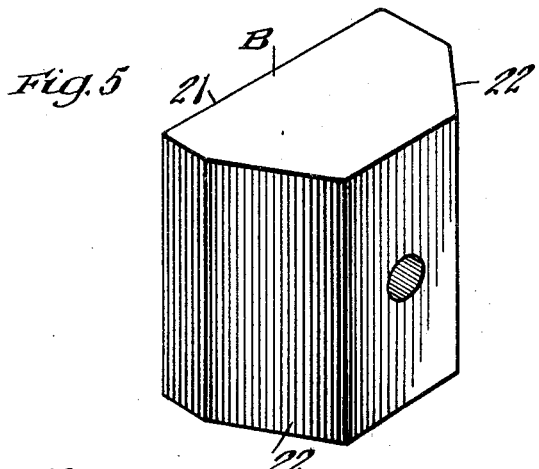
Inventor.
John F. O'Connor
By Joseph Harris
His Atty.
Witness
Wm. Geiger Patented Feb. 21, 1933

1,898,594

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed July 12, 1928, Serial No. 292,042, and in Canada July 26, 1924.

This invention relates to improvements in friction shock absorbing mechanisms.

This application is a continuation in part of my copending application Serial No. 713,127, for improvements in friction shock absorbing mechanisms, filed May 14, 1924.

One object of the invention is to provide a friction shock absorbing mechanism of the intercalated plate type, more particularly adapted for railway draft riggings, wherein is obtained high capacity due to large frictional areas, together with a graduated preliminary action of the wedged devices and certain of the friction elements, prior to actual relative movement of the friction plates to provide easy initial compression and to assure certain release of the parts when the actuating pressure is removed.

Another object of the invention is to provide a friction shock absorbing mechanism of the character indicated, comprising two relatively movable friction shells or casings having interior friction surfaces converging inwardly toward the center of the mechanism, and relatively movable friction plates directly coacting therewith, together with a wedge system directly coacting with the plates, whereby a differential wedge action is produced during the relative approach of the main followers and friction casings.

Still another object of the invention is to provide a friction shock absorbing mechanism of the intercalated plate type, including relatively movable friction shells or casings, two opposed groups of friction plates coacting with the casings, a friction wedge means coacting with the opposite ends of each group of plates, and a central, longitudinally disposed spring resistance coacting with said friction wedge means, together with spring carrying means supported by the shells and spanning the space therebetween.

Other objects and advantages of the invention will more clearly and fully appear from the description and claims hereinafter following.

In the drawings forming a part of this specification, Figure 1 is a horizontal, longitudinal sectional view of a portion of a railway draft rigging showing my improvements in connection therewith. Figure 2 is a vertical, transverse sectional view, corresponding substantially to the line 2—2 of Figure 1. Figure 3 is a vertical, longitudinal sectional view of the forward portion of the shock absorbing mechanism proper, corresponding substantially to the line 3—3 of Figure 1. Figure 4 is a detailed side elevational view of one of the friction plates used in connection with my improved mechanism. And Figure 5 is a detailed perspective view of one of the wedge pressure-transmitting elements.

In said drawings, 10—10 indicates channel-shaped center or draft sills of a railway car underframe, to the inner faces of which are secured front stop lugs 11—11 and rear stop lugs 12—12. A portion of the drawbar is shown at 13, to which is suitably attached a hooded yoke 14. The shock absorbing mechanism proper, and the front and rear followers 15 and 16 are disposed within the yoke. The yoke and the parts therein are supported by a detachable saddle plate 17.

The improved shock absorbing mechanism proper, as shown, comprises broadly front and rear friction casings A—A; front and rear wedge blocks B—B; front and rear pairs of wedge friction shoes C—C; two groups of intercalated friction plates D—D; front and rear spring followers E—E; front and rear sets of plate restoring bars F—F; a main spring resistance G; top and bottom spring carrying shoes H—H; and a retainer bolt J.

The front and rear friction casings A are of like construction, each being of rectangular box-like form, having a vertical transverse end wall 18 at one end and open at the opposite end. The inner sides of the opposite side walls of each casing present longitudinally extending friction surfaces 19, the opposed surfaces 19 of the front friction casing converging rearwardly and the opposed surfaces 19 of the rear friction casing converging forwardly. An opening 20 of rectangular outline is formed in the end wall 18 of each casing, the top, bottom and side edges of said opening being spaced from the top, bottom and sides of the corresponding casing, as clearly shown in Figures 1 and 3, thereby providing an interior abutment surface entirely around said opening.

The front and rear wedges B, which are of like construction, are in the form of cored, cast blocks. Each block B has a flat outer face 21 adapted to bear on the corresponding main follower, and a pair of flat faces 22 at the opposite end thereof converging inwardly of the mechanism and adapted to coact with the adjacent pair of friction shoes C. Each wedge block B extends through and works freely in the opening 20 of the end wall of the corresponding follower. The wedge blocks B, as clearly shown in Figures 1 and 3, project outwardly of the casings so that the casings are normally spaced from the followers 15 and 16.

The friction wedge shoes C are four in number, arranged in pairs at opposite ends of the mechanism, each pair coacting with a corresponding block B. Each of the shoes has an outer flat face 24 adapted to coact with the corresponding group of friction plates D. On the inner side, or the side nearest the axis of the mechanism, each shoe is provided with a lateral enlargement 25 having a front wedge face 122 adapted to coact with the corresponding wedge face 22 of the wedge B. The outer ends of each set of shoes normally abut the inner surface of the end wall 18 of the corresponding casing.

The front and rear spring followers E are of identical construction, each being in the form of a heavy, rectangular plate. Each plate E is disposed transversely of the mechanism and has the opposite ends thereof engaging the flat inner sides of the enlargements 25 of the corresponding shoes. As clearly shown in Figure 3, the plates E are of greater height than the wedge B and project above and below the same, for a purpose hereinafter described.

The spring resistance G comprises an inner light coil and an outer relatively heavier coil, said spring resistance being disposed longitudinally of the mechanism between the front and rear sets of shoes and having its opposite ends bearing respectively on the front and rear spring followers E.

The friction plates or elements D are arranged within the casings A and comprise two oppositely disposed groups, each group being preferably composed of six plates. All of the friction elements or plates D of both groups are of identical construction.

The friction elements D are preferably in the form of spring plates and, as best shown in Figure 4, each plate D has the upper and lower edges cut away at one end thereof to provide a reduced end section 26. Near the opposite end, each plate has the upper and lower edges recessed, as indicated at 27—27, the recesses being in vertical alinement.

The plates of each group are arranged in two sets, one set consisting of three plates 28—28 and the other set consisting of three plates 29—29, the plates 28 composing one set are alternated with the plates 29 of the other set and are reversely arranged thereto, so that the plates 28 have the ends provided with the recesses 27 at the forward end of the mechanism and the plates 29 have the ends provided with the recesses 27 disposed at the rear end of the mechanism. The plates composing each group are interposed between the corresponding set of front and rear shoes C and the adjacent side walls of the front and rear shells A, one of the plates 29 of each group being disposed outermost and engaging the respective casing friction surfaces 19 and a plate 28 of each group being disposed innermost and engaging the friction surfaces 24 of the corresponding shoes C. The plates are flexed during the assembling operation, so that each group of plates is bowed inwardly, as clearly shown in Figure 1, when the parts are in position.

The bars F are four in number, two being disposed at each end of the mechanism, one above and the other below the corresponding wedge block B. Each bar F is arranged transversely of the gear and is disposed outwardly of the corresponding spring follower E.

In the normal or full release position of the mechanism, the upper and lower set of bars F at each end of the gear are in the position shown in Figure 3, being in abutment with the corresponding spring follower E, each spring follower being extended above and below the corresponding wedge block B, as hereinbefore pointed out, for this purpose. The top and bottom bars associated with each wedge B extend laterally beyond the corresponding shoes at opposite sides of the mechanism. The opposite ends of the top and bottom bars at the forward end of the mechanism engage with the corresponding recesses 27 of the respective sets of plates 28 at the opposite sides of the mechanism, and the top and bottom bars at the rear end of the mechanism engage with the respective recesses 27 of the two sets of plates 29.

The recesses 27 of each plate are appreciably longer than the width of the coacting bars F, so that there will be a limited amount of play between the bars and plates.

The spring carrying shoes H are of like construction, each being in the form of an elongated casting. The two shoes H are disposed respectively above and below the spring resistance G and each shoe has the opposite ends disposed respectively within the front and rear follower castings A—A. Each shoe comprises a transversely curved plate-like main body portion of rectangular outline, presenting a longitudinally disposed concave inner bearing surface 30 corresponding in curvature to the outer coil of the spring G and forming a seat for the same.

Along the front, rear and sides of each shoe H are provided vertically disposed, outwardly extending flanges 31, the outer edges of the flanges of each shoe lying in a common horizontal plane. The flanges 31 of the upper shoe coact with the inner surface of the top walls of the front and rear casings and the flanges 31 of the bottom shoes bear on the inner surfaces of the bottom walls of said casings. As will be evident, the two shoes not only maintain the spring resistance G properly centered, but in addition serve to support the same and prevent sagging and bending thereof. The shoes H are of such a length that they will be supported by both casings at all times, but are not so long that they will ordinarily be engaged by the friction shoes C at full compression of the mechanism, a slight clearance being left to accomplish this result. The clearance is, however, not sufficient to prevent engagement between the shoes C at either end of the mechanism and one end of the shoes H to restore the shoes H to approximately centered position in the event that they become displaced during the operation of the mechanism. As shown in Figures 1 and 2, the sections of the friction shoes inwardly of the enlargements thereof are provided with concave seats 32 which receve the opposite ends of the spring resistance G, and thus support the spring resistance at both ends.

The overall length of the mechanism is maintained by the retainer bolt J extending through the inner coil of the spring resistance G and alined openings in the spring followers E having its front and rear ends anchored respectively within the recesses of the front and rear wedge blocks B. The retainer bolt, in addition to holding the parts in assembled relation, also serves to hold the mechanism under initial compression.

In the normal full release position of the mechanism, which is most clearly shown in Figures 1 and 3, the front ends of the plates 28 and the rear ends of the plates 29 of each group are respectively held in their outermost position by the front and rear sets of bars F, the front set of bars being in engagement with the shoulders at the forward ends of the recesses 27 of the plates 28 and the rear set of bars being in abutment with the shoulders at the rear ends of the recesses 27 of the plates 29. The bars are maintained in their outermost position by the spring followers E, outward movement of the latter being limited by engagement with the corresponding shoes C. The front ends of the plates 28 are thus held slightly spaced from the inner surface of the end wall of the front casting A and the rear ends of the plates 29 are held spaced a similar distance from the inner surface of the end wall of the rear casing A. The respective plates are of such a length that the rear ends of the plates 28 and the front ends of the plates 29 are spaced a sufficient distance from the end walls of the front and rear casings to permit the required full movement of the plates during the compression stroke, the reduced ends 26 working between the corresponding bars and being of such an extent as to assure proper clearance. The front and rear casings A are normally spaced inwardly from the corresponding followers, as shown in Figure 1, being held in that position by the shoes C, the outer ends of which are adapted to bear on the inner surfaces of the end walls 18 of the casings. The shoes are yieldingly maintained in their outermost position by the spring G acting through the spring followers E, outward movement of the shoes being in turn limited by engagement with the wedges B, and outward movement of the latter being limited by the retainer bolt J.

The operation of my improved shock absorbing mechanism is as follows, assuming an inward or buffing movement of the drawbar: Upon inward or rearward movement of the drawbar, the front follower 15 will be moved therewith, forcing the front wedge B and shoes C rearwardly therewith and compressing the spring resistance G, thereby forcing the rear pair of shoes against the rear wedge B. At the same time, a wedging action will be set up between each wedge and the corresponding set of shoes, placing the friction plates under lateral pressure. As the rearward movement of the front follower continues, the friction shoes C will tend to move the friction plates and front casing A rearwardly therewith, due to the friction between the shoes C and the two groups of plates, and between the latter and the front casing A. There will be a substantially equal resistance to the rearward movement of the plates and the rear casing A due to the friction between the rear shoes, plates and casing. This will result in a balancing action, and the rear casing A will approach the rear follower 16 at substantially the same rate as the front follower approaches the front casing, while the friction shoes slip on the inner plates 29 and the latter slip on the rear shoes C. Due to the taper of the casings and the inclined position of the plates, there will be a differential action during the relative movement of the shoes and plates, forcing the shoes of each set inwardly toward each other, slippage occurring on the coacting faces of the wedges and shoes. A gradually increasing initial frictional resistance is thus had during the operation just described. This action continues until the front follower engages the front casing A and the rear casing engages the rear follower, whereupon the front casing A will be moved rearwardly directly by the front follower while the rear casing will be held stationary by contact with the rear follower.

During further movement of the front follower and shell A, the end wall 18 of the latter will approach the front ends of the plates 28, and the plates 29 due to the friction of the parts will simultaneously approach the end wall of the rear casing A. During this operation, which marks the second stage of the initial action of the gear, the frictional resistance will be slightly increased over that during the first stage hereinbefore described, due to the additional friction created between the friction surfaces of the casings and the outermost plates of the two groups. Upon further compression of the mechanism, the ends of the plates 28 and 29 are engaged by the end walls of the corresponding casings and upon still further inward movement of the front follower, the plates will be moved relatively to each other, greatly augmenting the frictional resistance offered. It will be evident that during the time the plates are moved relatively as the shells approach each other, there will occur a flexing of the spring plates transversely of the mechanism. The relative movement of the casings will be arrested upon the adjacent inner ends thereof coming in engagement, whereupon the forces will be transmitted directly through the casings and followers to the rear stop lugs. When the wedges have been moved inwardly of the casings to the full extent of their relative movement, the spring followers will be moved away from the bars D.

During draft, the action is the reverse of that just described, the rear follower 16 being moved forwardly while the front follower 15 is held stationary.

Upon removal of the actuating force, the wedge pressure will be immediately relieved and there will be an initial easy release movement of the friction shoes D and wedge C, due to the spring followers E being spaced inwardly of the bars, as hereinbefore described. The only resistance which must, therefore, be overcome is the friction between the shoes and innermost plates of each group. This initial action assures an easy release and certain reduction of the lateral pressure on the groups of plates. It will also be evident that the release of the parts will be further facilitated due to the diverging relation of the two groups of plates at opposite ends of the mechanism. As the spring followers and shoes at the front end of the mechanism move outwardly relatively to the casing A, due to the expansive action of the spring resistance, the outer ends of said shoes will engage the end wall of the casing, and the corresponding spring follower will engage the front set of bars F and the bars in turn will engage the outer shoulders of the recesses 27 of the plates 28, thereby causing the front casing A and plates 28 to be carried outwardly also. Upon outward movement of the shoes at the front end of the mechanism, the spring resistance is permitted to expand, thereby relieving the pressure of the shoes C at the rear end of the mechanism and reducing the pressure on the plates. As the two sets of plates 28 move forwardly with the front casing, the other two sets of plates 29 and the rear casing A due to the friction between the parts, will be carried along therewith, until arrested by the outer shoulders of the recesses 27 of the plates 29 coming into engagement with the rear set of bars F and the end wall 18 of the rear casing coming into engagement with the outer ends of the corresponding shoes C. The inward movement of the rear sets of bars F is in turn arrested by engagement with the rear spring follower E. All of the parts will thus be restored to normal position by the expansion of the spring resistance G.

As wear occurs on the various friction and wedge surfaces, compensation therefor will be had by the wedge shoe C being moved apart due to the expansion of the spring resistance G, which is under initial compression, as hereinbefore described, the required outward movement of the wedge shoes being permitted by the casings A which are free to move toward the respective followers.

The preliminary relatively light frictional resistance particularly adapts the gear for passenger cars, the same being of such a capacity as to entirely absorb the ordinary shocks incident to starting and stopping of the train and also take care of the tractive effort of the locomotive during the time that the train is in motion. The shock absorbing capacity of the high resistance, relatively movable, friction plates of the gear is thus available for absorbing the heavier shocks during the time that the train is in motion, in addition to the unusually heavy shocks in starting and stopping.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with relatively movable front and rear followers; of a pair of friction casings interposed between said followers, said casings being movable toward each other each casing being normally slightly spaced from the corresponding follower and having opposed, inwardly converging friction surfaces; a pressure-transmitting wedge system coacting with each of said followers; two groups of intercalated friction plates, said groups being disposed on opposite sides of the mechanism and interposed between the friction wedge systems and the corresponding side walls of the casings; and a main spring resistance coacting with said wedge systems.

2. In a friction shock absorbing mechanism, the combination with relatively movable front and rear followers; of front and rear casings interposed between said followers, said casings being relatively movable toward each other one of said casings being normally slightly spaced from the corresponding follower, said last named casing having opposed, inwardly converging, friction surfaces; a pressure-transmitting wedge system coacting with one of said followers; two groups of intercalated flexible friction plates, said groups being disposed on opposite sides of the mechanism and interposed between the friction wedge system and the corresponding side walls of the casings; and a main spring resistance coacting with said friction wedge system.

3. In a friction shock absorbing mechanism, the combination with front and rear follower acting members, relatively movable toward each other; of front and rear friction casings, relatively movable toward and away from each other, said front casing having opposed, rearwardly converging, friction surfaces and said rear casing having opposed, forwardly converging friction surfaces; lateral wedge pressure-transmitting means directly engaging said followers, said means including friction shoes; longitudinally arranged spring friction plates within said casings, said plates being divided into two groups on opposite sides of said wedge pressure-transmitting means and directly engaging said friction shoes, the plates of each group being relatively movable during the compression stroke of the mechanism; and a main spring resistance coacting with said lateral pressure-transmitting means.

4. In a friction shock absorbing mechanism, the combination with a group of longitudinally disposed, relatively movable, intercalated spring plates having coacting friction surfaces; of a lateral pressure-transmitting means at each end of said mechanism, engaging said group of plates on one side along surface portions inclined to a longitudinal axis of the mechanism; a pair of relatively movable front and rear follower acting members having lateral pressure-resisting means associated therewith, said last named means engaging said groups of plates on the opposite side and maintaining the engaged portions of said group of plates in inwardly converging relation with reference to the longitudinal axis of the mechanism and engaged with said lateral pressure-transmitting means, whereby said plates are flexed during relative approach of said follower members; and a main spring resistance.

5. In a friction shock absorbing mechanism, the combination with intercalated friction plates comprising two sets, the plates of one set being alternated with the plates of the other and said sets of plates being relatively movable with respect to each other; of a main spring resistance; means for laterally compressing said intercalated plates, including a lateral pressure-transmitting wedge friction system engaging one side of said intercalated plates, a member held against lateral movement engaging said intercalated plates on the opposite side, said member maintaining the engaged portion of said plates inclined with reference to the longitudinal axis of the mechanism, and means opposing lateral movement of said friction wedge system in a direction away from said plates, said wedge friction system including wedge means and friction shoes having interengaging wedge faces inclined to the longitudinal axis of the mechanism, said system and member being relatively movable with respect to each other in a direction longitudinally of the mechanism during a predetermined initial action of the same, thereby effecting a differential wedge action, and said member directly receiving the actuating pressure subsequent to said predetermined initial action to be moved longitudinally in unison with said wedge friction system; and means movable in unison with said member and engageable with one set of plates for effecting movement thereof with respect to the other set.

6. In a friction shock absorbing mechanism, the combination with front and rear followers; of a set of longitudinally disposed intercalated friction plates comprising two sets of plates relatively movable with respect to each other; means cooperating with said rear follower opposing movement of one of said sets of plates; a lateral pressure-transmitting wedge friction system coacting with said front follower; means engaging said system to oppose lateral movement thereof away from said plates, said friction wedge system engaging at one side of said plates, said system including wedge means and shoes having interengaging wedge faces extending at an inclination to the longitudinal axis of the mechanism; a lateral pressure resisting member engaging said set of plates on the opposite side and maintaining said set of plates inclined with reference to the longitudinal axis of the mechanism to effect a differential wedge action during initial compression of the mechanism, said lateral pressure-resisting member being normally slightly spaced from said front follower and adapted to be engaged and actuated thereby after a predetermined relative movement of said friction wedge system and member to effect movement in unison of said member and system; means movable in unison with said member adapted to effect relative movement of said plates; and a spring resistance coacting with said wedge friction system.

In witness that I claim the foregoing I have hereunto subscribed my name this 10th day of July, 1928.

JOHN F. O'CONNOR.